US012462665B2

(12) United States Patent
Clemmons-Trigueros

(10) Patent No.: US 12,462,665 B2
(45) Date of Patent: *Nov. 4, 2025

(54) CHILD AND PET MONITORING SYSTEM FOR USE IN VEHICLES

(71) Applicant: Barbara A. Clemmons-Trigueros, San Diego, CA (US)

(72) Inventor: Barbara A. Clemmons-Trigueros, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,314

(22) Filed: Oct. 30, 2023

(65) Prior Publication Data

US 2024/0078891 A1 Mar. 7, 2024

Related U.S. Application Data

(63) Continuation of application No. 17/902,782, filed on Sep. 2, 2022, now Pat. No. 11,804,123, which is a
(Continued)

(51) Int. Cl.
*G08B 21/24* (2006.01)
*B60N 2/26* (2006.01)
(Continued)

(52) U.S. Cl.
CPC ............. *G08B 21/24* (2013.01); *B60N 2/267* (2023.08); *B60N 2/272* (2023.08); *B60N 2/28* (2013.01);
(Continued)

(58) Field of Classification Search
CPC .. G08B 21/24; G08B 21/0205; G08B 21/182; G08B 21/22; B60N 2/002; G01G 19/12
(Continued)

(56) References Cited

U.S. PATENT DOCUMENTS 5,949,340 A 9/1999 Rossi
6,104,293 A 8/2000 Rossi
(Continued)

FOREIGN PATENT DOCUMENTS

DE 102004044220 A1 4/2005
GB 2548489 A 9/2017
(Continued)

OTHER PUBLICATIONS

Baby Alert USA ChildMinder Soft Clip System, http://allaboutbabysworld.com/baby-alert-usa-childminder-soft-clip-system-review/, accessed May 17, 2021.
(Continued)

*Primary Examiner* — Zhen Y Wu
(74) *Attorney, Agent, or Firm* — Sheppard Mullin Richter & Hampton LLP

(57) ABSTRACT

A monitoring system for determining whether the child or pet has been left unattended within the vehicle. The system may include a vehicle device having a monitoring platform, an alarm switch, and an alert device, which may emit an alarm if a first sensor detects the presence of the child or pet and a second sensor detects that the vehicle is in an off state. The system further may include a portable alert device that detects its location relative to the vehicle device, and emits an alarm if it is located outside a predetermined zone surrounding the monitoring platform. In another embodiment, the system may include a vehicle device having a sensor that detects whether the vehicle transitions from an on state to an off state and an alert device that emits an alarm if the sensor detects that the vehicle transitions to the off state.

20 Claims, 5 Drawing Sheets

Related U.S. Application Data continuation of application No. 17/326,011, filed on May 20, 2021, now Pat. No. 11,436,909.

(60) Provisional application No. 63/029,316, filed on May 22, 2020.

(51) Int. Cl.
*B60N 2/28* (2006.01)
*G01G 19/12* (2006.01)
*G08B 21/02* (2006.01)
*G08B 21/18* (2006.01)
*G08B 21/22* (2006.01)

(52) U.S. Cl.
CPC ......... *G01G 19/12* (2013.01); *G08B 21/0205* (2013.01); *G08B 21/182* (2013.01); *G08B 21/22* (2013.01)

(58) Field of Classification Search
USPC ...................................................... 340/573.1
See application file for complete search history.

(56) References Cited

U.S. PATENT DOCUMENTS

| | | | |
|---|---|---|---|
| 6,714,132 B2 | 3/2004 | Edwards et al. | |
| 6,819,249 B1* | 11/2004 | Papp | B60N 2/0035 340/666 |
| 6,922,154 B2 | 7/2005 | Kraljic et al. | |
| 6,922,622 B2 | 7/2005 | Dulin et al. | |
| 6,930,614 B2* | 8/2005 | Rackham | B60R 25/1004 340/425.5 |
| 7,009,522 B2 | 3/2006 | Flanagan et al. | |
| 7,230,530 B1 | 6/2007 | Almquist | |
| 7,321,306 B2 | 1/2008 | Lee et al. | |
| 7,348,880 B2 | 3/2008 | Hules et al. | |
| 7,348,889 B2 | 3/2008 | Monzo et al. | |
| 7,567,181 B1* | 7/2009 | Davison | B60Q 9/00 340/665 |
| 8,058,983 B1 | 11/2011 | Davisson et al. | |
| 8,063,788 B1* | 11/2011 | Morningstar | B60N 2/28 340/439 |
| 8,768,292 B2 | 7/2014 | Welch | |
| 8,841,997 B2* | 9/2014 | Silveira | B60N 2/267 340/539.23 |
| 8,892,302 B1* | 11/2014 | McDonald | G08B 21/22 701/36 |
| 9,014,920 B1* | 4/2015 | Torres | G08B 21/0202 701/45 |
| 9,030,313 B1 | 5/2015 | Pearson | |
| 9,266,535 B2 | 2/2016 | Schoenberg | |
| 9,381,855 B1* | 7/2016 | Arnold | B60Q 5/005 |
| 9,424,728 B2 | 8/2016 | Rambadt | |
| 9,428,109 B2 | 8/2016 | Binnicker | |
| 9,457,716 B2* | 10/2016 | Westmoreland | B60N 2/274 |
| 9,545,856 B2* | 1/2017 | Borgne | G08B 21/22 |
| 9,564,036 B2 | 2/2017 | Striemer et al. | |
| 9,682,638 B1 | 6/2017 | Mccurdy | |
| 9,691,250 B2 | 6/2017 | Trang et al. | |
| 9,845,050 B1* | 12/2017 | Garza | G08B 21/0205 |
| 9,847,004 B1* | 12/2017 | Lan | G08B 21/24 |
| 9,870,706 B2 | 1/2018 | Alderman et al. | |
| 10,068,452 B1* | 9/2018 | Nunez | G08B 21/24 |
| 10,093,228 B1 | 10/2018 | Arnold et al. | |
| 10,102,729 B1* | 10/2018 | Hill | G08B 21/22 |
| 10,115,282 B1* | 10/2018 | Merrill | B60N 2/2821 |
| 10,124,724 B2 | 11/2018 | Huntzicker et al. | |
| 10,131,318 B2 | 11/2018 | Davis | |
| 10,163,316 B2 | 12/2018 | Roisen | |
| 10,239,448 B1* | 3/2019 | Samuel, Jr. | G08B 21/182 |
| 10,276,016 B2* | 4/2019 | Mattarocci | G08B 21/0266 |
| 10,297,130 B2 | 5/2019 | Friedman | |
| 10,384,564 B1* | 8/2019 | Zhanel | G08B 21/24 |
| 10,442,353 B1 | 10/2019 | Norman | |
| 10,467,877 B1 | 11/2019 | Elyakim | |
| 10,946,770 B1* | 3/2021 | Pate | G08B 21/22 |
| 10,991,225 B1* | 4/2021 | Lyons | B60N 2/003 |
| 2003/0122662 A1* | 7/2003 | Quinonez | B60N 2/2839 340/457 |
| 2006/0103516 A1* | 5/2006 | Zang | G08B 21/24 340/457 |
| 2008/0259475 A1* | 10/2008 | Bush | B60R 1/008 359/872 |
| 2009/0146912 A1* | 6/2009 | Hiramatsu | G01C 21/3688 345/2.2 |
| 2009/0174774 A1* | 7/2009 | Kinsley | H04N 7/183 348/148 |
| 2010/0078978 A1* | 4/2010 | Owens | G08B 21/22 297/250.1 |
| 2011/0205060 A1* | 8/2011 | Taylor | G08B 21/22 340/573.1 |
| 2012/0007741 A1* | 1/2012 | Laffey, Sr. | B60N 2/267 340/573.1 |
| 2012/0050021 A1* | 3/2012 | Rao | B60N 2/28 340/425.5 |
| 2013/0049947 A1* | 2/2013 | Lanter | B60N 2/268 297/217.3 |
| 2014/0253314 A1* | 9/2014 | Rambadt | G08B 21/0266 340/457.1 |
| 2015/0105976 A1* | 4/2015 | Shikii | B60W 40/08 701/36 |
| 2015/0274036 A1* | 10/2015 | Arad | G08B 21/22 340/573.1 |
| 2016/0200169 A1* | 7/2016 | Tjahjono | B60H 1/00742 701/45 |
| 2016/0272112 A1* | 9/2016 | DeGrazia | B60Q 9/00 |
| 2016/0379466 A1* | 12/2016 | Payant | B60N 2/267 340/457 |
| 2017/0013188 A1* | 1/2017 | Kothari | H04N 23/62 |
| 2017/0263098 A1* | 9/2017 | Garcia | B60N 2/0026 |
| 2018/0065504 A1* | 3/2018 | Lan | B60W 10/30 |
| 2018/0173230 A1* | 6/2018 | Goldman-Shenhar | B60W 50/08 |
| 2019/0057595 A1* | 2/2019 | Yamamoto | G08B 21/24 |
| 2020/0023770 A1* | 1/2020 | Kim | B60Q 5/005 |
| 2020/0086785 A1* | 3/2020 | Lee | G08B 21/22 |
| 2021/0061301 A1* | 3/2021 | Denthumdas | B60N 2/0025 |
| 2021/0142642 A1* | 5/2021 | Edri | B60N 2/267 |

FOREIGN PATENT DOCUMENTS

| | | |
|---|---|---|
| WO | 03032270 A1 | 4/2003 |
| WO | 2012/109472 A2 | 8/2012 |
| WO | 2013/035087 A1 | 3/2013 |
| WO | 2016/044075 A1 | 3/2016 |
| WO | 2017/065761 A1 | 4/2017 |
| WO | 2018/138728 A1 | 8/2018 |
| WO | 2018/185796 A1 | 10/2018 |

OTHER PUBLICATIONS

Baby Alert USA ChildMinder SoftClip System, Product Sheet, Jun. 2014, accessed from https://www.prweb.com/releases/2014/06/prweb11952816.htm, access date. May 18, 2021.

Cybex SensorSafe, https://cybex-online.com/en-us/sensorsafe, accessed May 17, 2021.

Driver's Little Helper app, https://appadvice.com/app/drivers-little-helper/1030469285, accessed May 17, 2021.

Elepho eClip Baby Reminder Car Seat Alarm, https://elepho.com/products/eclip-baby-reminder-for-your-car, accessed May 17, 2021.

Even Flow SensorSafe Car Seat Technology, hllps://www.evenflo.com/sensorsafe/sensorsafe.html, accessed May 17, 2021.

Forget Me Not Alarm. http://www.forgetmenotalarm.com/, accessed May 17, 2021.

Ismail, et al., Child Presence Detection System and Technologies, Journal of the Society of Automotive Engineers Malaysia, 3(3):290-297 (Sep. 2019).

Kars 4 Kids Safety App, https://www.kars4kids.org/safety-app/, accessed May 17, 2021.

(56) References Cited

OTHER PUBLICATIONS

Olesen, Patrick, "Auto Industry Agrees to Put Rear-Seat Reminder Systems in Most New Cars by 2025," Consumer Reports, https://www.consumerreports.org/car-safety/auto-industry-agrees-to-put-rear-seal-reminder-systems-in-most-new-cars-by-2025/, Sep. 4, 2019.
Ride & Remind Backset Reminder System, hllps://ridenremind.com/, accessed May 17, 2021.
Velez, Mandy, "The ANEIROS Vehicle Child Seat System Could Save Lives of Kids Who Are Left In Hot Cars", Huffington Post—Parenting, hllps://www.huffpost.com/entry/aneiros-vehicle-child-seat-system-_n_4979948, Mar. 17, 2014.

\* cited by examiner

CHILD AND PET MONITORING SYSTEM FOR USE IN VEHICLES

CROSS-REFERENCE TO RELATED APPLICATIONS

This application is a continuation of U.S. application Ser. No. 17/902,782, filed on Sep. 2, 2022, which claims priority to U.S. application Ser. No. 17/326,011, filed on May 20, 2021, which claims priority to U.S. Provisional Application Ser. No. 63/029,316, filed May 22, 2020, the entire contents of which are incorporated by reference herein.

FIELD OF USE

The present disclosure is directed to systems and methods for alerting a user of the presence of a child or pet in a vehicle.

BACKGROUND

Every year numerous children and pets are left unattended in vehicles, which can result in injuries or death. To prevent these accidents, monitoring systems were introduced to alert drivers to the presence of a child or pet within a vehicle. These systems help prevent the drivers from exiting or walking away from the vehicle without the child or pet that they may have forgotten about during their drive.

U.S. Pat. No. 10,442,353 describes a child safety assembly having a sensing unit positioned beneath a child car seat that wirelessly communicates with an alert unit positioned on the dashboard of a vehicle. The alert unit communicates with the vehicle to detect when the driver's side door is opened. When the driver's side door is opened and the sensing unit senses the weight of the child, the alert unit emits an alarm (e.g., spoken words, lights) to alert the driver to the presence of the child within the vehicle. This patent does not describe adjusting the alarm based on whether a child or an animal is located within the car.

U.S. Pat. No. 8,768,292 describes a system comprising a pressure sensor or chest clip sensor to detect the presence of a child within the vehicle, a control module that is located within a vehicle, and a portable device (e.g., key fob) that communicates with the control module. The portable device auto-connects and auto-activates with the control module and other transmitters. When the portable device is moved outside of a certain distance from the control module, an alarm is triggered and emitted from the fob. Alternatively or additionally, the control module may send an alert to the driver's mobile phone. The system may also be used for pet safety. This patent does not describe emitting an alarm from a control module inside the car when the vehicle is stopped or the driver's door of the vehicle is opened.

U.S. Patent Pub. No. 2003/0122662 describes a system that provides a warning when a child has been left in a vehicle and 1) the vehicle's door has opened and/or 2) a key ring remote unit is not located within a predetermined zone around the vehicle. The system includes a child detection mechanism to detect whether a child is within the vehicle, a door position detection mechanism to detect whether the driver's side door is closed, a range detection mechanism to detect the range of a key ring remote, two alarm units, and two control units that generates alarm signals when either of 1) or 2) above occurs. One control unit is located within the key ring remote and the other is located on the dashboard of the vehicle. This patent does not describe adjusting the alarm based on whether a child or an animal is located within the car.

U.S. Pat. No. 7,348,889 describes a self-activating system for warning when a child has been left in a vehicle for a predetermined amount of time after the vehicle has been shut off. A detector senses the presence of a child and an ignition detection mechanism determines the state of the ignition system. A triggering system sends a signal to a microprocessor control when both a child has been detected and the ignition has been shut off for a predetermined period of time, and a customizable recorded message is emitted from a speaker. The system also includes a pager that will emit an audible signal or vibration if the user is outside a range. This patent does not describe an alarm switch that is disposed on a control module and configured to switch between at least two modes.

It is with respect to these and other considerations that the disclosure made herein is presented.

SUMMARY

The present disclosure overcomes the drawbacks of previously-known systems and methods by providing a child and pet monitoring system which allows the user to easily switch between, e.g., a child mode and a pet mode.

The monitoring system includes a first sensor configured to generate a first output if the first sensor detects the presence of a child or an animal within a vehicle. The monitoring system also includes a second sensor that is operatively coupled to the vehicle. The second sensor is configured to generate a second output if the second sensor detects the vehicle is in an off state.

The first sensor may be disposed under a child car seat and may be configured to generate a first output when the first sensor detects a weight exceeding a predetermined threshold. Alternatively, the first sensor may be disposed on a pet collar and may be configured to generate a first output when the first sensor is located within a predetermined distance from a monitoring platform. The second sensor may be operatively coupled to the vehicle and may be configured to generate a second output when the second sensor stops receiving power from the vehicle or when the second sensor detects that a door of the vehicle is opened.

The monitoring system further includes a vehicle device that is removably coupled to the vehicle. The vehicle device includes a monitoring platform that is configured to receive the first output and the second output, an alarm switch that is configured to switch between a first mode and a second mode, and an alert device that is operatively coupled to the monitoring platform. The alert device is configured to emit an alarm when the monitoring platform receives the first output from the first sensor and the second output from the second sensor. The alarm may be a first alarm when the alarm switch is in the first mode and may be a second alarm when the alarm switch is in the second mode, such that the second alarm may be different from the first alarm. For example, the first alarm corresponding to the first mode may indicate that a child has been left unattended in the vehicle while the second alarm corresponding to the second mode may indicate that a pet has been left unattended in the vehicle. The alert device may include a first alarm button configured to stop the alarm when the first alarm button is pressed.

The monitoring system may additionally include a portable alert device that is operatively coupled to the monitoring platform. The portable alert device includes a third sensor and is configured to emit a portable alert device alarm if the third sensor is located outside a predetermined zone surrounding the monitoring platform. The portable device alarm may be a third alarm when the alarm switch is in the first mode and may be a fourth alarm when the alarm switch is in the second mode. The portable alert device may be a mobile device having a mobile device application that is configured to modify the alarms corresponding to the first mode and the second mode. Alternatively, the portable device may be a key fob that may vibrate and/or emit an alarm when the key fob is located outside the predetermined zone surrounding the monitoring platform.

The vehicle device may further include a temperature sensor that is configured to generate a temperature output if the temperature inside the vehicle exceeds a predetermined threshold. The monitoring platform may be configured to receive the temperature output and the alert device may be configured to emit an alarm when the monitoring platform receives the temperature output.

In an alternative embodiment, the monitoring system includes a sensor that is operatively coupled to the vehicle and is configured to generate an output if the sensor detects the vehicle is in an off state. The sensor may be configured to generate an output when the sensor stops receiving power from the vehicle or when the sensor detects that the vehicle has stopped moving for a predetermined period of time.

The monitoring system further includes a vehicle device that is removably coupled to the vehicle and may be coupled to a power outlet of the vehicle. The vehicle device may include at least one USB port. The vehicle device includes a monitoring platform that is configured to receive the output and an alert device that is operatively coupled to the monitoring platform. The sensor may also be disposed within the vehicle device or may instead be separate from the vehicle device. The alert device is configured to emit an alarm when the monitoring platform receives the output from the sensor and the monitoring platform generates a command to emit the alarm. The alert device may be configured to stop emitting the alarm after a predetermined period of time.

DETAILED DESCRIPTION

Systems described herein may be used to detect the presence of a child or pet within a vehicle and to determine whether the child or pet has been left unattended within the vehicle. The system may include a first sensor that detects whether the child or pet is located within the vehicle, a second sensor that detects whether the vehicle is in an off state, a vehicle device having a monitoring platform, an alarm switch with a first mode (e.g., child mode) and a second mode (e.g., pet mode), and an alert device operatively coupled to the monitoring platform. The alert device may emit an alarm if the first sensor detects the presence of the child or pet within the vehicle and the second sensor detects that the vehicle is in an off state. The system may additionally include a portable alert device, configured to be transported by the driver of the vehicle, the portable alert device having a third sensor that detects whether the portable alert device is located outside a predetermined zone surrounding the monitoring platform. The portable alert device may emit an alarm if the first sensor detects the presence of the child or pet within the vehicle and the third sensor detects that the portable alert device is located outside the predetermined zone surrounding the monitoring platform.

Figure 1:
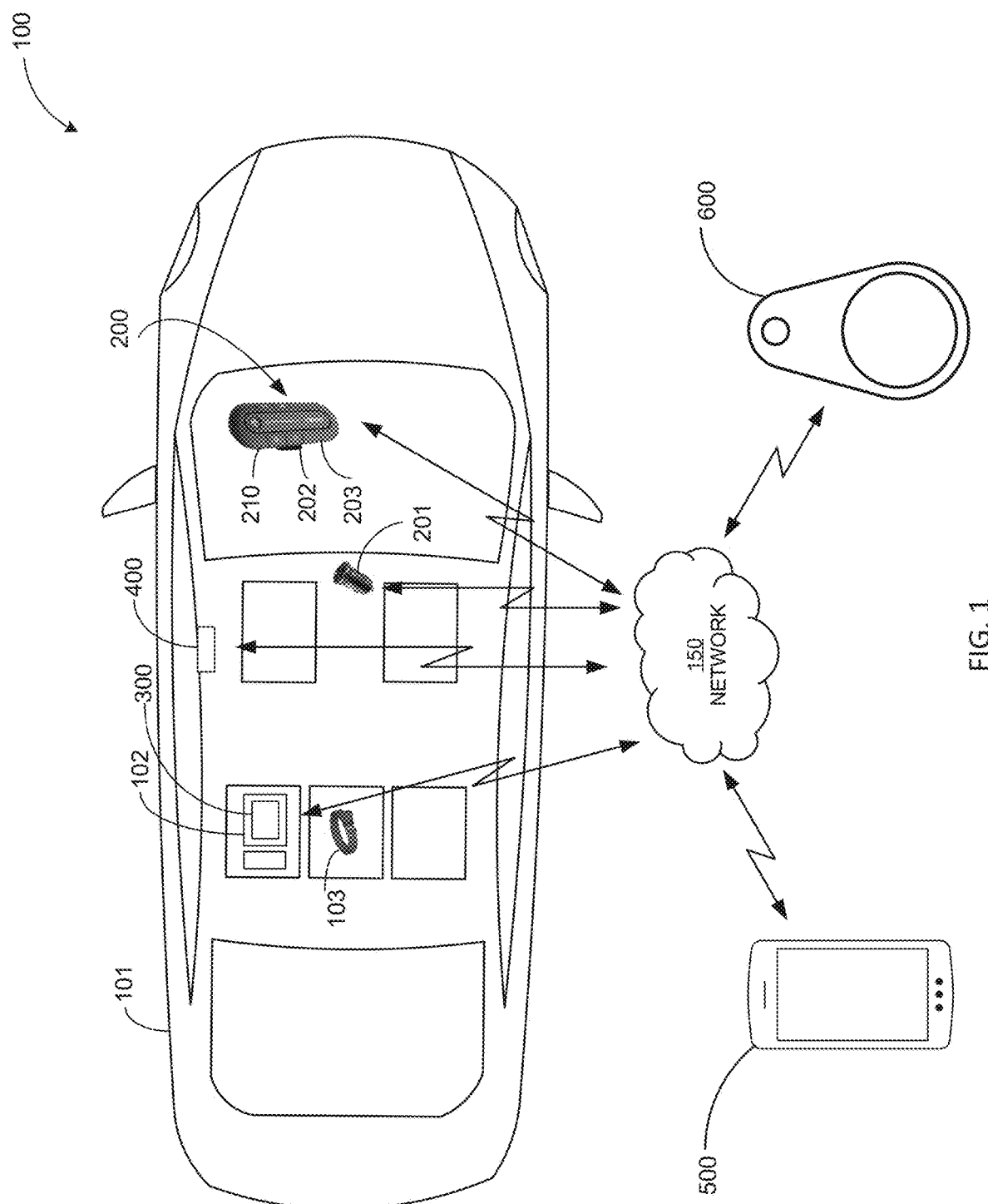
FIG. 1 illustrates a vehicle monitoring system in accordance with the principles of the present disclosure.

Referring to FIG. 1, an overview of an exemplary vehicle monitoring system constructed in accordance with the principles of the present disclosure is provided. In FIG. 1, components of the system are not depicted to scale on either a relative or absolute basis. Vehicle monitoring system 100 may include vehicle 101, a vehicle device, e.g., hands-free device 200 having alert device 201, alarm switch 202, temperature sensor 203, and monitoring platform 210, mammal detecting device 300, vehicle detecting device 400, and, optionally, a portable alert device, such as mobile device 500 and/or key fob 600, all communicatively coupled via, e.g., network 150.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between monitoring platform 210 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Hands-free device 200 may be disposed anywhere within vehicle 101, but preferably is disposed near the visor of vehicle 101 such that hands-free device 200 is within the eyesight and earshot of the driver of vehicle 101. For example, hands-free device 200 may be coupled to the visor of vehicle 101. Hands-free device 200 may be connected to vehicle 101 via a USB port or other power outlet. Alternatively, hands-free device 200 may include a rechargeable battery that may be charged prior to placing hands-free device 200 within vehicle 101. In addition, hands-free device 200 may include at least one USB port and may be configured to charge mobile device 500. Hands-free device 200 may be removably coupled to the vehicle such that it may be moved to different a vehicle. Hands-free device 200 may include monitoring platform 210, which is configured to receive outputs from sensors disposed within alert device 201, mammal detecting device 300, vehicle detecting device 400, and, optionally, mobile device 500 and/or key fob 600. Monitoring platform 210 includes memory 220 having multiple modules, as described further below. Alternatively, monitoring platform 210 may be integrated into vehicle 101. For example, monitoring platform 210 may be incorporated into the vehicle during manufacturing of the vehicle.

Hands-free device 200 is operatively coupled to alert device 201. For example, alert device 201 may be integrated with hands-free device 200, and accordingly located within vehicle 101 where hands-free device 200 is located, e.g., within the eyesight and earshot of the driver of vehicle 101. Alternatively, hands-free device 200 may be a separate device from alert device 201. Thus, alert device 201 may be coupled to a power outlet within vehicle 101, e.g., a cigarette light socket. Alert device 201 is configured to emit an alarm when alert device 201 receives a command from monitoring platform 210 via network 150. For example, alert device 201 may receive a command if both the sensor disposed with mammal detecting device 300 generates an output, indicating that a child or pet is disposed within the vehicle, and the sensor disposed within vehicle detecting device 400 generates an output, indicating that the vehicle is in an off state. Alternatively, or additionally, mobile device 500 and/or key fob 600 may receive a command if the sensor disposed with mammal detecting device 300 generates an output and the sensor disposed within the portable alert device generates an output, indicating that the portable alert device is located outside a predetermined zone surrounding hands-free device 200. Alert device 201 may include an alarm button, which may be configured to stop the alarm when pressed. Preferably, alert device 201 is configured to stop the alarm after a predetermined period of time, e.g., 10 seconds, 30 seconds, or one minute.

Hands-free device 200 may include alarm switch 202 configured to switch between a first mode and a second mode, the first mode associated with a first alarm and the second mode associated with a second alarm, different from the first alarm. For example, the first mode may be a "child mode" and may be switched on when, e.g., the driver prefers to detect the presence of a child within the vehicle. The first alarm associated with the first mode may be a unique alarm that indicates that the child has been left unattended in the vehicle. For example, the first alarm may be programmed to include the sound of a crying baby and/or a pre-recorded message, e.g., "You forgot about me!" The second mode may be a "pet mode" and may be switched on when, e.g., the driver prefers to detect the presence of a pet within the vehicle. The second alarm associated with the second mode may be a unique alarm that indicates that the pet has been left unattended in the vehicle. For example, the second alarm may be programmed to include a dog barking and/or a pre-recorded message, e.g., "You forgot about me!" Additionally or alternatively, the alarms may include flashing lights, vibrations, or spoken words or sounds. Such alarms may be emitted from alert device 201 or a portable alert device (e.g., mobile device 500, or key fob 600). As described further below, mobile device 500 may have a mobile device application, which may be used to modify the alarms or to create custom alarms.

Hands-free device 200 may also include temperature sensor 203 that is configured to generate a temperature output, which is received by monitoring platform 210, the temperature output indicating that the temperature inside the vehicle exceeds a predetermined threshold. For example, the predetermined threshold may be set at a temperature that is unsafe for children or pets, e.g. 100° F. Alert device 201 may be configured to emit a temperature alarm when alert device 201 receives a command from monitoring platform 210 when temperature sensor 203 generates the temperature output.

Mammal detecting device 300 may include at least one sensor that may be used to detect the presence of a child or pet within the vehicle. For example, mammal detecting device 300 may include a sensor that, upon detection of the child or pet, generates an output, which may be transmitted to monitoring platform 210. The output may be communicated to monitoring platform 210 via network 150.

In some embodiments, mammal detecting device 300 may include a weight sensor and be sized and shaped to be disposed under child car seat 102, such that the weight sensor generates an output when the sensor detects a weight exceeding a predetermined threshold. For example, the predetermined threshold may be 7 pounds, such that mammal detecting device 300 detects when at least a small child is placed into child car seat 102. Alternatively, mammal detecting device 300 may be disposed on a seat belt of child car seat 102, such that the sensor is configured to generate an output when a seat belt tongue is inserted into the seat belt buckle. Additionally or alternative, mammal detecting device 300 may be used to detect the presence of a pet within the vehicle. For example, mammal detecting device 300 may include a sensor sized and shaped to be disposed on pet collar 103. Accordingly, the sensor may generate an output when mammal detecting device 300 is within a predetermined distance from monitoring platform 210. Moreover, mammal detection device 300 may include a Bluetooth tag for communicating with monitoring platform 200 via Bluetooth communication over network 150.

Vehicle detecting device 400 may include at least one sensor that may be used to detect whether vehicle 101 is in an off state. For example, vehicle detecting device 400 may include a sensor that, upon detection that vehicle 101 is in the off state, generates an output, which may be transmitted to monitoring platform 210. The output may be communicated to monitoring platform 210 via network 150.

The sensor of vehicle detecting device 400 may detect when the engine is shut off. For example, the sensor may be connected to the USB port of vehicle 101, such that when vehicle 101 is shut off and the USB port stops receiving power from vehicle 101, the sensor generates an output. Alternatively, vehicle detecting device 400 may include an accelerometer that detects the movement of vehicle 101, such that when vehicle 101 has stopped moving for a predetermined period of time, the sensor generates an output. Further, vehicle detecting device 400 may be operatively connected to the driver's door of the vehicle, such that the output is generated when the driver's door is opened.

Monitoring system 100 may additionally include a portable alert device, which may include, e.g., mobile device 500, key fob 600, and/or another device separate from monitoring platform 200 and alert device 201, and be sized and shaped to be transported by the driver. Mobile device 500 may be an iPhone™ or Android™ device having a user interface, and further may include a mobile device application. The mobile device application may be used to modify the alarms for the first and second mode and, additionally, may be used to create custom alarms. For example, the user may pre-record audio messages that may be emitted when either the first or second alerts are administered.

The portable alert device (e.g., mobile device 500 or key fob 600) is operatively coupled to monitoring platform 200 and has at least one sensor that may be used to detect whether the portable alert device is moved a predetermined distance from monitoring platform 210. For example, the portable alert device may include a sensor that, upon detection that the portable alert device has been moved outside a predetermined zone from monitoring platform 210, generates an output, which may be transmitted to monitoring platform 210. The output may be communicated to monitoring platform 210 via network 150. For example, the sensor may generate the output when the portable alert device is farther than, e.g., 5, 10, or 20 feet away from monitoring platform 210. The mobile device application may be used to modify when the alarms are triggered. For example, the mobile device application may expand the predetermined zone surrounding monitoring platform 210, such that mobile device 500, held by the driver of the vehicle, is permitted to move farther away from vehicle 101 without triggering the portable alert device alarm.

Monitoring platform 210 is operatively coupled to the portable alert device, which is configured to emit a portable alert device alarm when the portable alert device receives a command from monitoring platform 210. For example, the portable alert device may receive a command if the sensor disposed within mammal detecting device 300 generates an output and the sensor disposed within the portable alert device generates an output, indicating that the portable alert device is located outside the predetermined zone surrounding monitoring platform 210. Alternatively, or additionally, the portable alert device may receive a command if both the sensor disposed within mammal detecting device 300 generates an output, indicating that a child or pet is disposed within the vehicle, and the sensor disposed within vehicle detecting device 400 generates an output, indicating that the vehicle is in an off state. One or both of the portable alert device and the alert device may be configured to emit an alarm if either of the alert devices receives a command from monitoring platform 210. The portable alert device may also include an alarm button, which may be configured to stop the alarm when pressed.

Figure 2:
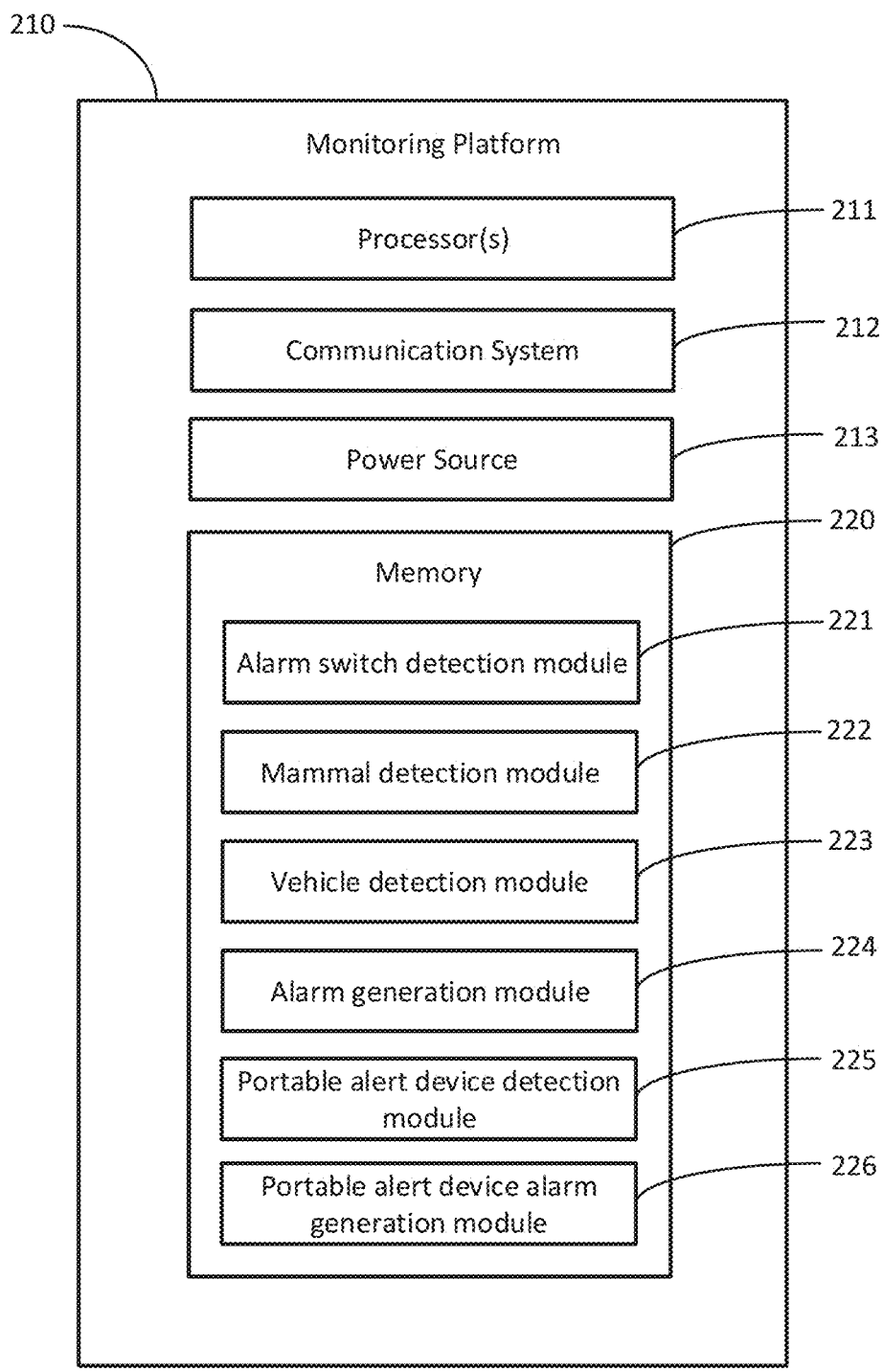
FIG. 2 shows example components that may be included in a monitoring platform in accordance with the principles of the present disclosure.

Referring now to FIG. 2, components that may be included in monitoring platform 210 are described in further detail. Monitoring platform 210 may include one or more processors 211, communication system 212, power source 213, and memory 220. Communication system 212 may include a wireless transceiver that allows monitoring platform 210 to communicate with mammal detecting device 300, vehicle detecting device 400, mobile device 500, and key fob 600. The wireless transceiver may use any of various communications formats, such as, for example, an Internet communications format, a Bluetooth communications format, or a cellular communications format, etc. Power source 213 powers the electrical components of monitoring platform 210, and may comprise a primary cell or battery, a secondary (rechargeable) cell or battery or a combination of both. Alternatively, power source 213 may be operatively coupled to vehicle 101.

Memory 220, which is one example of a non-transitory computer-readable medium, may be used to store alarm switch detection module 221, mammal detection module 222, vehicle detection module 223, alarm generation module 224, portable alert device detection module 225, and portable alert device alarm generation module 226. The modules are provided in the form of computer-executable instructions that may be executed by processor 211 for performing various operations in accordance with the disclosure.

Memory 220 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 220 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Alarm switch detection module 221 may be executed by processor 211 for receiving and processing data from alarm switch 202 disposed on monitoring platform 210. For example, when the driver of vehicle 101 switches alarm switch 202 to the first mode (e.g., "child mode"), the driver indicates that they prefer to detect the presence of a child within vehicle 101. This information is then communicated to monitoring platform 210 so that the first alarm, rather than the second alarm, is emitted when the alarm is triggered.

Mammal detection module 222 may be executed by processor 211 for receiving and processing data from a sensor disposed within mammal detecting device 300. As described above, the sensor may detect weight, may detect when a car seat belt has been buckled, and/or may detect whether a pet is located within a predetermined distance from monitoring platform 210. The sensor is configured to generate an output, which is received by mammal detection module 222, when the predetermined thresholds are met, indicating that a child or pet is located within vehicle 101.

Vehicle detection module 223 may be executed by processor 211 for receiving and processing data from a sensor disposed within vehicle detecting device 400. As described above, the sensor may detect when the driver's door is opened, may detect when vehicle 101 is shut off, and/or may be an accelerometer that detects when vehicle 101 has stopped moving. The sensor is configured to generate an output, which is received by vehicle detection module 223, upon detection that vehicle 101 is in an off state.

Alarm generation module 224 may be executed by processor 211 for generating a command to emit an alarm, such that the command may be communicated to alert device 201 via network 150. Alarm generation module 224 may generate the command when mammal detection module 222 receives and processes an output from the sensor of mammal detecting device 300 and when vehicle detection module 223 receives and processes an output from the sensor of vehicle detecting device 300. Alarm generation module 224 may also communicate alarm switch data based on the configuration of alarm switch 202, so that the proper alarm is emitted to indicate that either a child or a pet has been left unattended in vehicle 101.

Portable alert device detection module 225 may be executed by processor 21 for receiving and processing data from a sensor disposed within a portable alert device, e.g., mobile device 500 or key fob 600. As described above, the sensor detects whether the portable alert device is located outside a predetermined zone surrounding monitoring platform 210. The sensor is configured to generate an output, which is received by portable alert device detection module 225, when the predetermined thresholds are met, indicating that the driver of vehicle 101 has moved away from vehicle 101.

Portable alert device alarm generation module 226 may be executed by processor 211 for generating a command to emit an alarm, so that the command is communicated to the portable alert device via network 150. Portable alert device alarm generation module 226 may generate the command when mammal detection module 222 receives and processes an output from the sensor of mammal detecting device 300 and when portable alert device detection module 225 receives and processes an output from the sensor of the portable alert device. Portable alert device alarm generation module 226 may also communicate alarm switch data based on the configuration of alarm switch 202, so that the proper alarm is emitted to indicate that either a child or a pet has been left unattended in vehicle 101.

Figure 3:
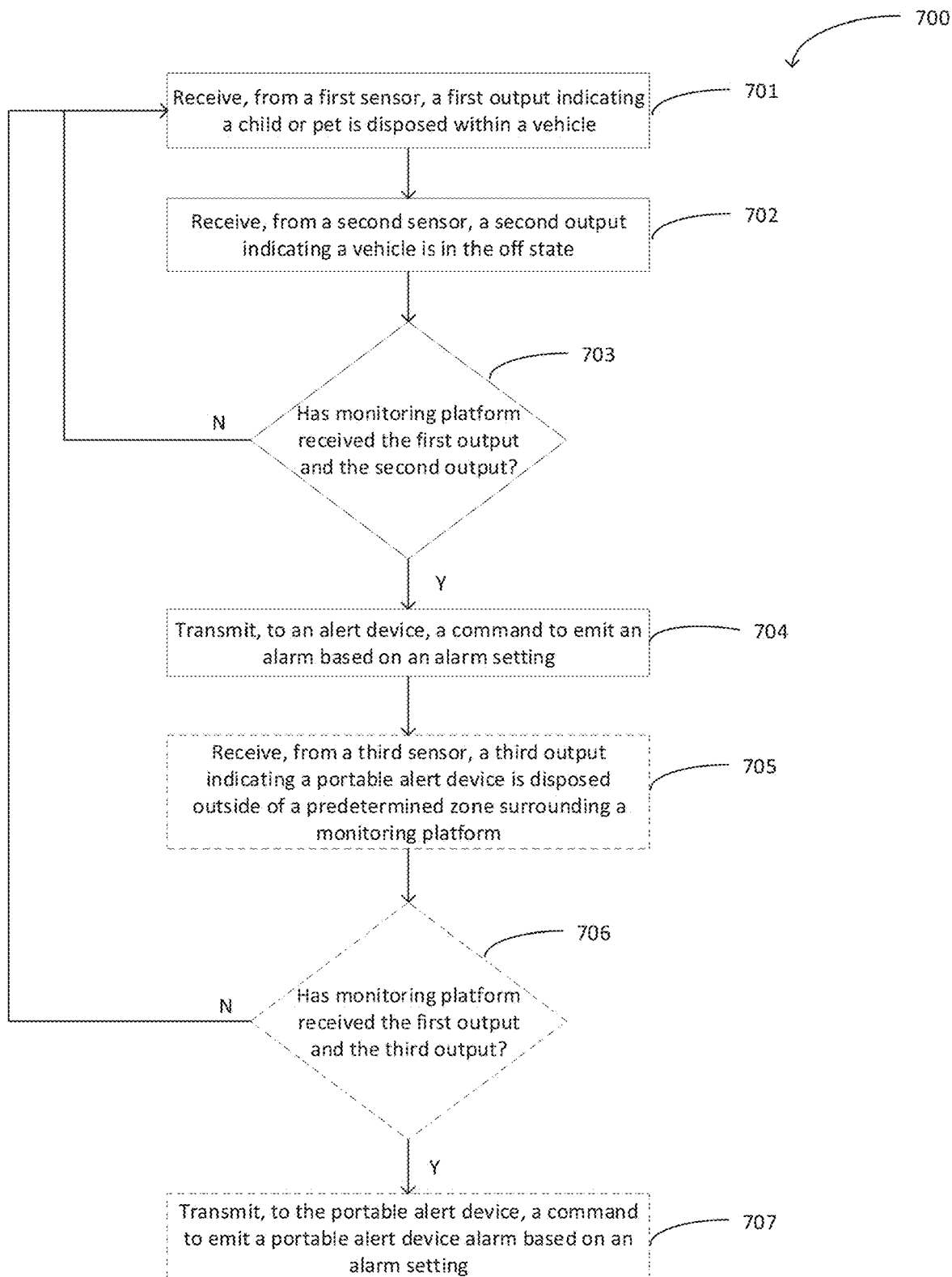
FIG. 3 is a flow chart illustrating exemplary steps for monitoring a child or pet in accordance with the principles of the present disclosure.

Referring now to FIG. 3, exemplary method 700 for monitoring a child or pet is described. At step 701, monitoring platform 210 receives, from a first sensor disposed within mammal detecting device 300, a first output indicating that a child or pet is located within the vehicle. At step 702, monitoring platform 210 receives, from a second sensor disposed within vehicle detecting device 400, a second output indicating that the vehicle is in an off state. At decision 703, monitoring platform 210 determines whether it received both the first output from the first sensor and the second output from the second sensor, indicating that a child or pet has been left unattended in the vehicle. At step 704, if monitoring platform 210 determines that it received the first output and the second output, monitoring platform 210 will transmit, to an alert device, a command to emit an alarm. The command will be based on the alarm setting as determined by the alarm switch. If monitoring platform 210 determines that it did not receive either the first output or the second output, exemplary method 700 will start again at step 701.

Optionally, at step 705, monitoring platform 210 receives, from a third sensor disposed within a portable alert device (e.g., mobile device 500 or key fob 600), a third output indicating that the portable alert device is disposed outside of a predetermined zone surrounding monitoring platform 210. Optionally, at decision 706, monitoring platform 210 determines whether it received both the first output from the first sensor and the third output from the third sensor, indicating that a child or pet has been left unattended in the vehicle. Optionally, at step 707, if monitoring platform 210 determined that it received the first output and the third output, monitoring platform 210 will transmit, to the portable alert device, a command to emit an alarm. The command will be based on the alarm setting as determined by the alarm switch. If monitoring platform 210 determined that it did not receive either the first output or the third output, exemplary method 700 will start again at step 701.

Figure 4:
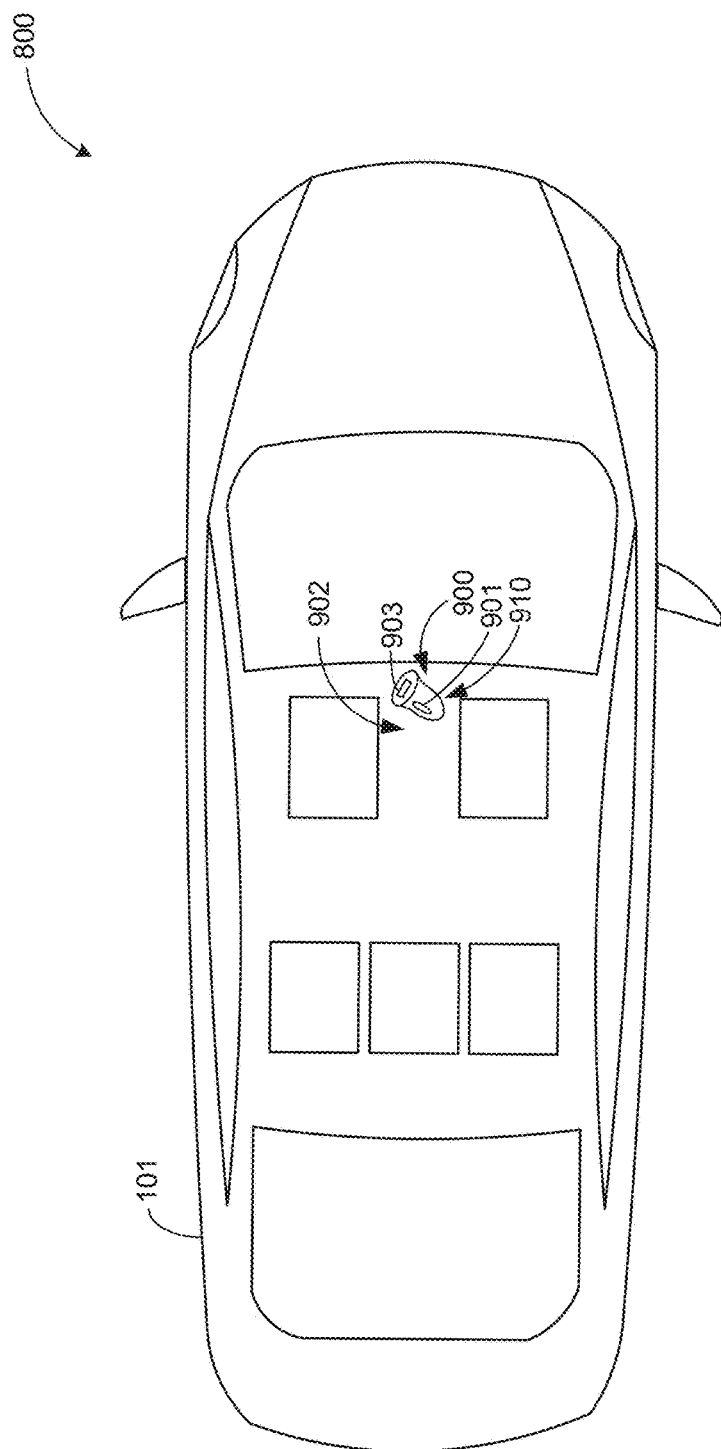
FIG. 4 illustrates an alternative embodiment of the vehicle monitoring system in accordance with the principles of the present disclosure.

Referring now to FIG. 4, an overview of an alternative embodiment of the vehicle monitoring system constructed in accordance with the principles of the present disclosure is illustrated. Vehicle monitoring system 800 is configured to automatically generate an alarm when the vehicle transitions from an on state to an off state, the alarm not dependent upon whether a child or pet is detected within the vehicle. Vehicle monitoring system 800 may include vehicle 101 and vehicle device 900 having alert device 901, sensor 902, USB port 903, and monitoring platform 910.

Vehicle device 900 may be disposed anywhere within vehicle 100, but preferably is disposed within the earshot of the driver of vehicle 101 and coupled to a power outlet within vehicle 101, e.g., a cigarette light socket. Vehicle device 900 may include at least one USB port 903, which may be configured to charge a mobile device or other device. In a preferred embodiment, vehicle device 900 may be removably coupled to vehicle 101 such that is may be moved and plugged into a different vehicle.

Vehicle device 900 may include monitoring platform 910, which is configured to receive outputs from sensor 902 of vehicle device 900. Monitoring platform 910 includes memory 920 having multiple modules, as described further below. Monitoring platform 910 is operatively coupled to alert device 901, which may be similar to alert device 201 described above.

Preferably, alert device 901 may be integrated with vehicle device 900, and accordingly located within vehicle 101 where vehicle device 900 is located, e.g., within the earshot of the driver of vehicle 101. Preferably, alert device 901 is configured to emit an alarm when alert device 901 receives a command from monitoring platform 910. For example, alert device 901 may receive a command if sensor 902 disposed within vehicle 101 generates an output, indicating that the vehicle is in an off state. The emitted alarm may be programmed to include the sound of a crying baby and/or a pre-recorded message, e.g., "You forgot about me!" Additionally or alternatively, the emitted alarm may include flashing lights, vibrations, or spoken words or sounds. Alert device 901 may include an alarm button, which may be configured to stop the alarm when pressed. Preferably, alert device 901 is configured to stop the alarm after a predetermined period of time, e.g., 10 seconds, 30 seconds, or one minute.

Sensor 902 may be similar to the sensor within vehicle detecting device 400 described above that detects whether vehicle 101 is in an off state, such that sensor 902 may be used to detect when vehicle 101 transitions from an on state to an off state. Upon detection that vehicle 101 is in the off state, sensor 902 generates an output, which may be transmitted to monitoring platform 910. Preferably, sensor 902 is integrated within vehicle device 900.

Sensor 902 may detect when the engine of vehicle 101 transitions from an on state to an off state. For example, sensor 902 may be connected to the cigarette lighter socket/USB port of vehicle 101, such that when vehicle 101 is shut off and the cigarette lighter socket/USB port stops receiving power from vehicle 101, sensor 902 generates an output. Alternatively, sensor 902 may be an accelerometer that detects movement of vehicle 101, such that when vehicle 101 has stopped moving for a predetermined period of time, sensor 902 generates an output.

Figure 5:
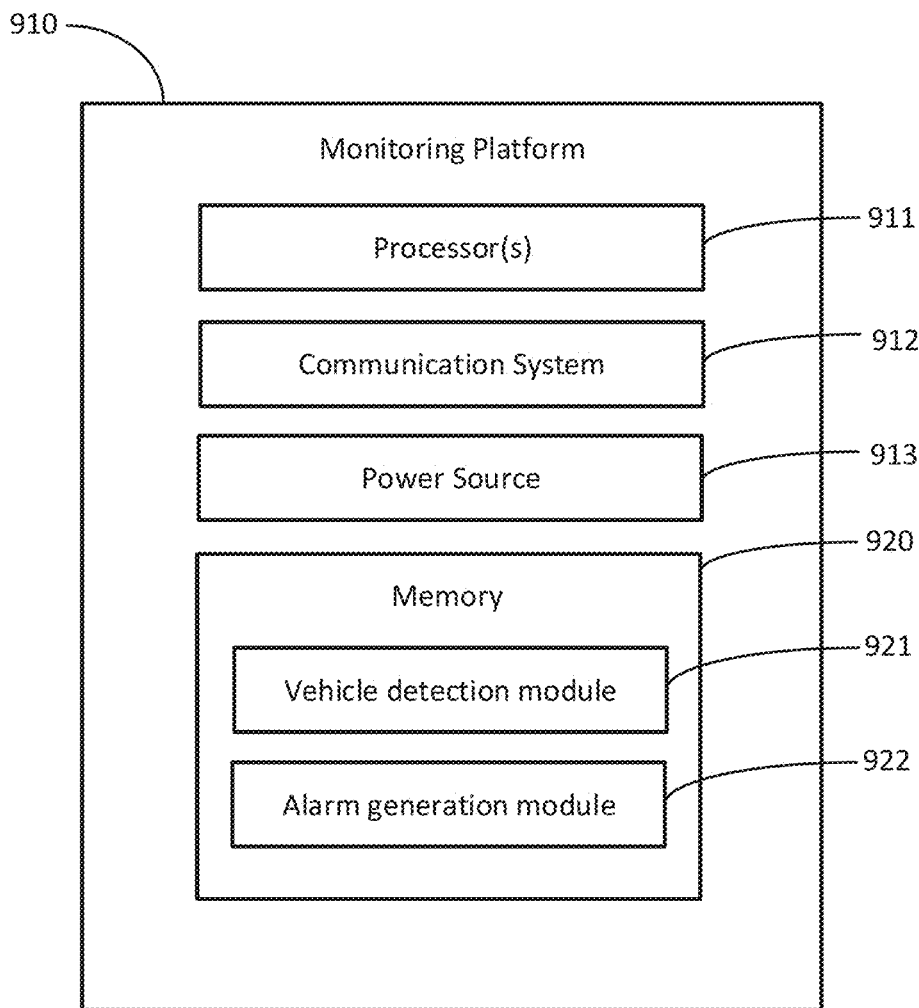
FIG. 5 shows example components that may be included in an alternative embodiment of the monitoring platform in accordance with the principles of the present disclosure.

Referring now to FIG. 5, example components that may be included in an alternative embodiment of the monitoring are illustrated. Monitoring platform 910 may be similar to monitoring platform 210 described above and may include one or more processors 911, communication system 912, power source 913, and memory 920. Communication system 912 may include a wireless transceiver that allows monitoring platform 910 to communicate with sensor 902 and alert device 901. The wireless transceiver may use any of various communications formats, such as, for example, an Internet communications format, a Bluetooth communications format, or a cellular communications format, etc. Power source 913 powers the electrical components of monitoring platform 910, and may comprise a primary cell or battery, a secondary (rechargeable) cell or battery or a combination of both. Alternatively, power source 913 may be operatively coupled to vehicle 101 such that power source 913 receives power from vehicle 101.

Memory 920, which is one example of a non-transitory computer-readable medium, may be used to store vehicle detection module 921 and alarm generation module 922. The modules are provided in the form of computer-executable instructions that may be executed by processor 911 for performing various operations in accordance with the disclosure. Memory 920 may similar to memory 220 described above and may include any one memory element or a combination of volatile memory elements and non-volatile memory elements. Moreover, memory 920 may incorporate electronic, magnetic, optical, and/or other types of storage media.

Vehicle detection module 921 may be executed by processor 911 for receiving and processing data from sensor 902 disposed within vehicle 101. As described above, sensor 902 may detect when the driver's door is opened, may detect when vehicle 101 is shut off, and/or may be an accelerometer that detects when vehicle 101 has stopped moving. Sensor 902 is configured to generate an output, which is received by vehicle detection module 921, upon detection that vehicle 101 is in an off state.

Alarm generation module 922 may be executed by processor 911 for generating a command to emit an alarm, such that the command may be communicated to alert device 901. Alarm generation module 922 may generate the command when vehicle detection module 921 receives and processes data from sensor 902. Upon receipt of the command from alarm generation module 922, alert device 901 may emit an alarm as described above, to thereby remind the driver of vehicle 101 to check the interior of vehicle 101 for any children and/or pets.

While various illustrative embodiments of the disclosure are described above, it will be apparent to one skilled in the art that various changes and modifications may be made therein without departing from the disclosure. The appended claims are intended to cover all such changes and modifications that fall within the true scope of the disclosure.

What is claimed:

1. A monitoring system, comprising:
a first sensor configured to detect a child or an animal in a vehicle;
a second sensor configured to detect whether the vehicle is in an off state; and
a vehicle device, comprising:
a processor configured to receive output from the first and second sensors;
an alarm switch having a child mode and a pet mode, the alarm switch being switchable between the child mode and the pet mode by a user; and
an alert device communicatively coupled to the processor and the alarm switch.

2. The monitoring system of claim 1, further comprising a portable alert device communicatively coupled to the processor and the alarm switch.

3. The monitoring system of claim 2, wherein the portable alert device further comprises a portable sensor that detects whether the portable alert device is outside a threshold zone around the vehicle.

4. The monitoring system of claim 3, wherein the portable alert devices produces an alert when (i) the first sensor detects the child or the animal is in the vehicle, (ii) the second sensor detects the vehicle is in the off state, and (iii) the portable sensor detects that the portable alert device is outside the threshold zone around the vehicle.

5. The monitoring system of claim 4, wherein the alert is not produced if any of conditions (i), (ii), or (iii) are not met.

6. The monitoring system of claim 1, wherein the first sensor is disposed:
under a car seat, wherein the first sensor detects weight exceeding a predetermined threshold; or
onto the animal, wherein the first sensor detects distance of the first sensor from the vehicle.

7. The monitoring system of claim 1, wherein the processor is incorporated into the vehicle during manufacturing of the vehicle.

8. The monitoring system of claim 1, wherein the vehicle device is coupled to a power outlet within the vehicle.

9. The monitoring system of claim 8, wherein the power outlet is a cigarette lighter socket or a Universal Serial Bus (USB) port.

10. The monitoring system of claim 1, wherein the vehicle device further comprises a temperature sensor configured to generate an output when a temperature inside the vehicle exceeds a predetermined temperature threshold.

11. The monitoring system of claim 1, wherein the child mode is associated with a first audible alarm and the pet mode is associated with a second audible alarm, the second audible alarm being different from the first audible alarm.

12. A method of monitoring a child or an animal in a vehicle, the method comprising:
detecting, from a weight sensor, whether the child is on a seat in the vehicle;
detecting, from a proximity sensor, whether the animal is in a threshold proximity of the vehicle;
detecting, from an alarm switch, whether a user set the alarm switch to a child mode or a pet mode;
detecting, from a power sensor, whether the vehicle is in an off state;
determining, via a processor configured to receive information from the weight sensor, the proximity sensor, the alarm switch, and the power sensor, whether the child or the animal is present in the vehicle in the off state;
determining an alert to produce based on whether the user set the alarm switch to the child mode or the pet mode; and
producing the alert when the processor determines that the child or the animal is present in the vehicle in the off state.

13. The method of claim 12, wherein the weight sensor is disposed under a child car seat.

14. The method of claim 12, wherein the proximity sensor is disposed on a pet collar.

15. The method of claim 12, wherein the power sensor is coupled to a power outlet in the vehicle.

16. The method of claim 15, wherein the power outlet in the vehicle is a cigarette lighter socket or a Universal Serial Bus (USB) port.

17. The method of claim 12, wherein producing the alert comprises:
emitting a first audible alarm when the alarm switch is in the child mode; and
emitting a second audible alarm different from the first audible alarm when the alarm switch is in the pet mode.

18. The method of claim 12, wherein the processor and an alert device are incorporated into the vehicle during manufacturing of the vehicle, the alert device being configured to produce the alert.

19. The method of claim 12, wherein:
the processor is coupled to an alert device, the alert device being configured to produce the alert; and the processor and the alert device are removably coupled to the vehicle such that the processor and the alert device are portable.

20. The monitoring system of claim 11, wherein:

the first audible alarm comprises a first prerecorded message; and the second audible alarm comprises a second prerecorded message different from the first prerecorded message.

\* \* \* \* \*